United States Patent [19]
Ohkubo et al.

[11] Patent Number: 5,979,997
[45] Date of Patent: Nov. 9, 1999

[54] HYDRAULIC BRAKE CONTROL APPARATUS

[75] Inventors: Masayasu Ohkubo, Okazaki; Fumiaki Kawahata, Toyota; Amane Shimura, Anjo; Hirohiko Morikawa, Toyota; Akira Sakai, Toyota; Akihiro Ohtomo, Toyota, all of Japan

[73] Assignee: Toyota Jidosha Kabushiki Kaisha, Aichi-ken, Japan

[21] Appl. No.: 08/883,912

[22] Filed: Jun. 27, 1997

[30]     Foreign Application Priority Data

Jul. 2, 1996  [JP]  Japan ................................. 8-172539

[51] Int. Cl.⁶ .................................................. B60T 13/12
[52] U.S. Cl. ................................. 303/116.1; 303/119.2; 303/162; 303/166; 303/14; 303/84.1; 303/122.09
[58] Field of Search .......................... 303/13, 14, 84.1, 303/84.2, 113.1, 122.09, 122.12, 122, 122.13, 122.14, 122.1, 900–901, 10–12, 166, 114.1, 162, 115.2, 117.1, 119.2, 119.1, 116.1, 116.2, DIG. 1, DIG. 2, DIG. 3, DIG. 4; 188/151 A, 358

[56]     References Cited

U.S. PATENT DOCUMENTS

| | | | |
|---|---|---|---|
| 4,166,654 | 9/1979 | Snodgrass | 303/14 |
| 4,600,243 | 7/1986 | Belart et al. | |
| 4,637,662 | 1/1987 | Brown | 303/122.1 |
| 4,792,192 | 12/1988 | Tveitane | 303/14 |
| 4,812,777 | 3/1989 | Shirai | |
| 4,858,737 | 8/1989 | Tourneur | 303/122.13 |
| 4,886,321 | 12/1989 | La Broise et al. | 303/122.09 |
| 4,902,075 | 2/1990 | Uno et al. | 303/14 |
| 5,044,697 | 9/1991 | Longyear et al. | 303/14 |
| 5,567,021 | 10/1996 | Gaillard | 303/DIG. 4 |
| 5,655,820 | 8/1997 | Kervagoret | 303/14 |
| 5,709,438 | 1/1998 | Isakson et al. | 303/122.12 |

FOREIGN PATENT DOCUMENTS

| | | |
|---|---|---|
| WO96/11129 | 4/1996 | European Pat. Off. |
| 4229041 | 3/1993 | Germany |
| 19504393 | 3/1996 | Germany |
| 19634763 | 3/1997 | Germany |
| 4-243655 | 8/1992 | Japan |

*Primary Examiner*—Douglas C. Butler
*Attorney, Agent, or Firm*—Kenyon & Kenyon

[57]            ABSTRACT

A hydraulic brake control apparatus includes a pressure supply inhibiting unit which inhibits supply of a brake fluid pressure to wheel cylinders by a first pressure supplying unit when a defect in a brake fluid path between a first flow control unit and the wheel cylinders has occurred, and inhibits supply of a brake fluid pressure to the wheel cylinders by a second pressure supplying unit when a defect in a brake fluid path between a second flow control unit and the wheel cylinders has occurred. A pressure supply path control unit controls the first and second flow control units when a defect in one of a first brake fluid path between the first pressure supplying unit and the first flow control unit and a second brake fluid path between the second pressure supplying unit and the second flow control unit has occurred, such that a flow of the brake fluid from one of the first and second pressure supplying units connected to the defective path, into the wheel cylinders is inhibited, and a flow of the brake fluid from the other of the first and second pressure supplying units connected to the other path, into the wheel cylinders is allowed to supply the brake fluid pressure from the other pressure supplying unit to the wheel cylinders through the other path.

10 Claims, 5 Drawing Sheets

HYDRAULIC BRAKE CONTROL APPARATUS

BACKGROUND OF THE INVENTION

(1) Field of the Invention

The present invention generally relates to a hydraulic brake control apparatus, and more particularly to a hydraulic brake control apparatus which appropriately controls a brake fluid pressure in a brake system of an automotive vehicle.

(2) Description of the Related Art

A hydraulic brake control apparatus having two pressure supplying units connected to wheel cylinders of the automotive vehicle is known. For example, Japanese Laid-Open Patent Application No. 4-243655 discloses such a hydraulic brake control apparatus.

In this hydraulic brake control apparatus, a master cylinder and a high-pressure supplying unit are provided as the two pressure supplying units. The master cylinder supplies a brake fluid pressure varied in response to a brake operating force on a brake pedal, to the wheel cylinders. The high-pressure supplying unit supplies a given brake fluid pressure, regardless of the brake operating force, to the wheel cylinders.

In the apparatus of the above-mentioned publication, the master cylinder is connected to the wheel cylinders via flow control valves, and the high-pressure supplying unit is connected to the wheel cylinders via flow control valves. When the high-pressure supplying unit operates normally, the flow of the brake fluid from the master cylinder to the wheel cylinders is inhibited by the flow control valves, and the brake fluid pressure from the high-pressure supplying unit is supplied to the wheel cylinders.

On the other hand, when a defect in the high-pressure supplying unit has occurred, the flow of the brake fluid from the high-pressure supplying unit to the wheel cylinders is inhibited by the flow control valves, and the flow of the brake fluid from the master cylinder to the wheel cylinders is allowed by the flow control valves. In this case, the brake fluid pressure, varied in response to the brake operating force on the brake pedal, is supplied by the master cylinder to the wheel cylinders.

According to the apparatus of the above-mentioned publication, it is possible to supply a proper brake fluid pressure from the high-pressure supplying unit to the wheel cylinders when the high-pressure supplying unit operates normally, and it is possible to supply a proper brake fluid pressure from the master cylinder to the wheel cylinders when the high-pressure supplying unit is defective. By utilizing the above apparatus, a fail-safe function of the brake system against a defect in the high-pressure supplying unit can be achieved.

If the brake fluid pressure is continuously supplied by the pressure supplying units when a defect in any of brake fluid paths between the pressure supplying units and the wheel cylinders has occurred, the brake fluid may leak out of the defective path. In order to avoid this, a brake fluid supply stopping control is carried out by a conventional brake system when the occurrence of the defect in the brake fluid paths is detected. When the brake fluid supply stopping control is carried out, the supply of the brake fluid pressure to the wheel cylinders through the defective path is stopped to prevent the leak of the brake fluid.

Generally, a hydraulic circuit in the brake system of the automotive vehicle is divided into two hydraulic circuit systems. When a defect in a brake fluid path of one hydraulic circuit system has occurred in the conventional brake system, the supply of the brake fluid pressure to the wheel cylinders through the defective path is stopped, and the supply of the brake fluid pressure to the wheel cylinders through brake fluid paths of the other hydraulic circuit system is maintained. Therefore, by utilizing the conventional brake system, a fail-safe function against a defect in one of the two hydraulic circuit systems is achieved, and a braking force on the vehicle is produced by using the other hydraulic circuit system in which no defect occurs.

However, if the supply of the brake fluid to the wheel cylinders through one hydraulic circuit system is stopped when a defect in one of the brake fluid paths of the hydraulic circuit system has occurred, it is difficult for the brake system to produce an adequate level of braking force on the vehicle by using only the brake fluid pressure supplied to the wheel cylinders through the normal hydraulic circuit system.

If the flow of the brake fluid between the defective path and the wheel cylinders is inhibited by suitably setting the flow control valves of the hydraulic circuit system when the occurrence of the defect in the hydraulic circuit system is detected, it is not necessary to stop the supply of the brake fluid pressure to the wheel cylinders through the defective hydraulic circuit system. It is desirable to provide a fail-safe brake system which effectively produces an adequately great braking force without causing the leak of the brake fluid when a defect in one of the brake fluid paths of the brake system has occurred.

SUMMARY OF THE INVENTION

An object of the present invention is to provide an improved hydraulic brake control apparatus in which the above-described problems are eliminated.

Another object of the present invention is to provide a hydraulic brake control apparatus which effectively produces an adequately great braking force without causing the leak of the brake fluid when a defect in one of the brake fluid paths between the pressure supplying units and the wheel cylinders has occurred.

The above-mentioned objects of the present invention are achieved by a hydraulic brake control apparatus in which a first pressure supplying unit is connected to wheel cylinders via a first flow control unit, the first pressure supplying unit supplying a brake fluid pressure to the wheel cylinders through the first flow control unit, and a second pressure supplying unit is connected to the wheel cylinders via a second flow control unit, the second pressure supplying unit supplying a brake fluid pressure to the wheel cylinders through the second flow control unit, the apparatus comprising: a pressure supply inhibiting unit which inhibits the supply of the brake fluid pressure to the wheel cylinders by the first pressure supplying unit when a defect in a brake fluid path between the first flow control unit and the wheel cylinders has occurred, and inhibits the supply of the brake fluid pressure to the wheel cylinders by the second pressure supplying unit when a defect in a brake fluid path between the second flow control unit and the wheel cylinders has occurred; and a pressure supply path control unit which controls the first and second flow control units when a defect in one of a first brake fluid path between the first pressure supplying unit and the first flow control unit and a second brake fluid path between the second pressure supplying unit and the second flow control unit has occurred, such that a flow of the brake fluid from one of the first and second pressure supplying units connected to the defective path, into the wheel cylinders is inhibited, and a flow of the brake fluid from the other of the first and second pressure supplying units connected to the other path, into the wheel cylinders is allowed to supply the brake fluid pressure from the other pressure supplying unit to the wheel cylinders through the other path.

In the hydraulic brake control apparatus of the present invention, each of the first flow control unit and the second flow control unit is set at one of an opened position and a closed position. When the first flow control unit is set at the opened position or the closed position, the flow of the brake fluid from the first pressure supplying unit into the wheel cylinders is allowed or inhibited. When the second flow control unit is set at the opened position or the closed position, the flow of the brake fluid from the second pressure supplying unit into the wheel cylinders is allowed or inhibited.

If the brake fluid pressure is supplied to the wheel cylinders when a defect in the brake fluid path between the first flow control unit and the wheel cylinders has occurred or a defect in the brake fluid path between the second flow control unit and the wheel cylinders has occurred, the leak of the brake fluid from the defective path may occur. The pressure supply inhibiting unit inhibits the supply of the brake fluid pressure to the wheel cylinders under such conditions, and it is possible to avoid the leak of the brake fluid from the defective path.

When a defect in one of the first brake fluid path and the second brake fluid path has occurred, the pressure supply path control unit inhibits the flow of the brake fluid from one of the first and second pressure supplying units connected to the defective path, into the wheel cylinders, and allows the flow of the brake fluid from the other of the first and second pressure supplying units connected to the normal path, into the wheel cylinders. Therefore, the brake fluid pressure from the other pressure supplying unit is supplied by the pressure supply path control unit to the wheel cylinders through the normal path. If the brake fluid is fed into the wheel cylinders through the normal path, the leak of the brake fluid does not occur.

Accordingly, in the hydraulic brake control apparatus of the present invention, it is possible to effectively supply an adequately high brake fluid pressure from one of the first and second pressure supplying units to the wheel cylinders without causing the leak of the brake fluid from the defective path when the defect in one of the first brake fluid path and the second brake fluid path has occurred. Therefore, the hydraulic brake control apparatus of the present invention enables the brake system to effectively produce an adequately great braking force on the vehicle.

Alternatively, in the hydraulic brake control apparatus of the present invention, a single flow control unit, for example, a three-position valve with three ports, may be used instead of the first flow control unit and the second flow control unit.

BRIEF DESCRIPTION OF THE DRAWINGS

Other objects, features and advantages of the present invention will be more apparent from the following detailed description when read in conjunction with the accompanying drawings in which.

DESCRIPTION OF THE PREFERRED EMBODIMENT

A description will now be given of the preferred embodiment of the present invention with reference to the accompanying drawings.

Figure 1:
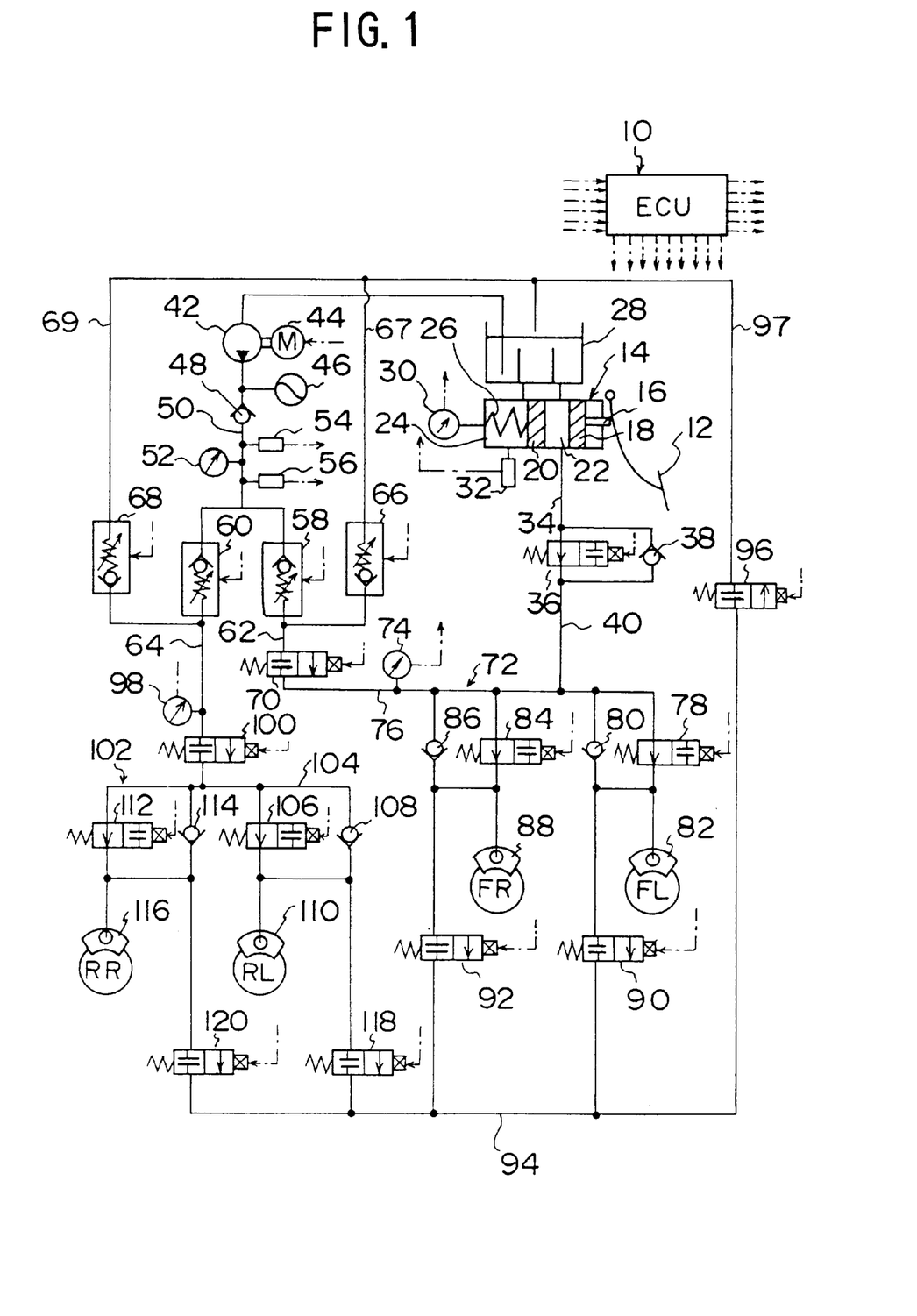
FIG. 1 is a diagram of a brake system to which the hydraulic brake control apparatus of the present invention is applied.

FIG. 1 shows a brake system of an automotive vehicle to which a hydraulic brake control apparatus of the present invention is applied.

As shown in FIG. 1, the brake system includes an electronic control unit (ECU) 10. The electronic control unit 10 controls the elements of the brake system in accordance with the operating conditions of the vehicle. Hereinafter, the electronic control unit 10 will be called the ECU 10.

In FIG. 1, input signal paths over which signals from the elements of the brake system are sent to the ECU 10, and output signal paths over which signals from the ECU 10 are sent to the elements of the brake system are omitted for the sake of convenience. Unless otherwise specified, these signal paths are indicated by dotted-line arrows in FIG. 1, and brake fluid paths on which brake fluid is supplied between the elements of the brake system are indicated by solid lines in FIG. 1.

The brake system comprises a brake pedal 12. The brake pedal 12 is connected to an input shaft 16 of a master cylinder 14.

The master cylinder 14 includes a first piston 18 and a second piston 20 which are provided in the master cylinder 14. The first piston 18 is connected to the input shaft 16 via a front surface of the master cylinder 14. In the master cylinder 14, a first pressure chamber 22 between the first piston 18 and the second piston 20 is provided, and a second pressure chamber 24 between the second piston 20 and a rear surface of the master cylinder 14 is provided. In the second pressure chamber 24, a spring 26 is provided, and the spring 26 exerts an actuating force on the second piston 20 to push the second piston 20 toward the brake pedal 12.

When the brake pedal 12 is set at an original position (or the brake pedal 12 is not depressed by the vehicle operator), the first piston 18 and the second piston 20 in the master cylinder 14 are set at starting positions. When the brake pedal 12 is set at an operated position (or the brake pedal 12 is depressed by the vehicle operator) and then released, the first piston 18 and the second piston 20 are returned to the starting positions.

A reservoir tank 28 is provided above the master cylinder 14. The reservoir tank 28 contains a brake fluid stored therein. The reservoir tank 28 is connected to both the first pressure chamber 22 and the second pressure chamber 24 only when the first piston 18 and the second piston 20 are set at the starting positions in the master cylinder 14. Otherwise the reservoir tank 28 is disconnected from the master cylinder 14. Therefore, the brake fluid in the reservoir tank 28 is replenished to both the first pressure chamber 22 and the second pressure chamber 24 of the master cylinder 14 each time the brake pedal 12 is released by the vehicle operator or set at the original position.

A master cylinder pressure sensor 30 (which will be called the Pmc sensor 30) and a pressure switch 32 are provided in the second pressure chamber 24 of the master cylinder 14.

The Pmc sensor 30 outputs a signal indicative of a brake fluid pressure in the second pressure chamber 24 of the master cylinder 14. The signal output from the Pmc sensor 30 is supplied to the ECU 10. The ECU 10 detects a master cylinder pressure Pmc (which will be called the pressure Pmc) based on the signal from the Pmc sensor 30.

The pressure switch 32 outputs an ON signal when the brake fluid pressure in the master cylinder 14 is higher than a reference level. The ON signal from the pressure switch 32 is supplied to the ECU 10. The ECU 10 detects whether the brake pedal 12 is set at the operated position (or whether it is depressed by the vehicle operator), based on whether the ON signal from the pressure switch 32 is supplied to the ECU 10.

A pressure passage 34 is connected at one end to the first pressure chamber 22 of the master cylinder 14. The pressure passage 34 is connected at the other end to a pressure passage 40 via a master cylinder cut valve 36 (which will be called the MCV 36). In addition, the pressure passage 34 is connected to the pressure passage 40 via a bypass passage in which a check valve 38 is provided.

The MCV 36 is an electromagnetic flow control valve which is electrically set at one of an opened position and a closed position. When a drive signal from the ECU 10 is not supplied to the MCV 36, the MCV 36 is always at the opened position so that the brake fluid from the master cylinder 14 is allowed to flow into the pressure passage 40 via the MCV 36. When the drive signal from the ECU 10 is supplied to the MCV 36, the MCV 36 is electrically set at the closed position, so that a flow of the brake fluid from the master cylinder 14 into the pressure passage 40 via the MCV 36 is inhibited.

The check valve 38 is a type of valve which allows a flow of fluid in one direction only. The check valve 38 allows the flow of the brake fluid from the pressure passage 34 to the pressure passage 40 via the bypass passage. The check valve 38 inhibits the flow of the brake fluid in the opposite direction.

The brake system comprises a pump 42. The pump 42 is provided with an actuating motor 44. The actuating motor 44 actuates the pump 42 so that the pump 42 supplies a high-pressure brake fluid. The operation of the motor 44 is controlled by the ECU 10. An inlet port of the pump 42 is connected to the reservoir tank 28. An outlet port of the pump 42 is connected to a high-pressure passage 50 via a check valve 48. An accumulator 46 is provided between the outlet port of the pump 42 and the check valve 48, and the accumulator 46 and the pump 42 connected to each other.

An accumulator pressure sensor 52 (which will be called the Pacc sensor 52) is connected to the high-pressure passage 50. The Pacc sensor 52 outputs a signal indicative of a brake fluid pressure in the high-pressure passage 50. The signal output from the Pacc sensor 52 is supplied to the ECU 10. The ECU 10 detects the brake fluid pressure in the high-pressure passage 50 based on the signal from the Pacc sensor 52. An accumulator pressure Pacc (which will be called the pressure Pacc) in the accumulator 46 is equivalent to the brake fluid pressure in the high-pressure passage 50. That is, the ECU 10 detects the present level of the pressure Pacc in the accumulator 46 based on the signal from the Pacc sensor 52.

An upper-limit sensor 54 and a lower-limit sensor 56 are connected to the high-pressure passage 50 at positions adjacent to the Pacc sensor 52. The upper-limit sensor 54 outputs an ON signal when the brake fluid pressure (or the pressure Pacc) in the high-pressure passage 50 is higher than an upper limit of a predetermined operating pressure range of the pressures Pacc for the accumulator 46. The lower-limit sensor 56 outputs an ON signal when the brake fluid pressure in the high-pressure passage 50 is lower than a lower limit of the predetermined operating pressure range of the pressures Pacc for the accumulator 46. Both the signal from the upper-limit sensor 54 and the signal from the lower-limit sensor 56 are supplied to the ECU 10.

When the lower-limit sensor 56 outputs an ON signal to the ECU 10, the ECU 10 supplies a drive signal to the motor 44 so that the pump 42 is actuated by the motor 44. The ECU 10 continues to supply the drive signal to the motor 44 until the upper-limit sensor 54 outputs an ON signal to the ECU 10. According to this operation, the pressure Pacc in the accumulator 46 is always maintained to be in the predetermined operating pressure range.

A pressure-up linear valve 58 and a pressure-up linear valve 60 are connected to the high-pressure passage 50 at the end of the high-pressure passage 50. The pressure-up linear valve 58 is connected at the other end to a front pressure passage 62, and the pressure-up linear valve 60 is connected at the other end to a rear pressure passage 64.

The front pressure passage 62 is connected to the reservoir tank 28 via a first return passage 67 in which a pressure-down linear valve 66 is provided. The rear pressure passage 64 is connected to the reservoir tank 28 via a second return passage 69 in which a pressure-down linear valve 68 is provided.

When drive signals are not supplied by the ECU 10, the pressure-up linear valves 58 and 60 and the pressure-down linear valves 66 and 68 are set at the closed positions. When the drive signals are supplied by the ECU 10, the pressure-up linear valves 58 and 60 and the pressure-down linear valves 66 and 68 are set at the opened positions. When one of the four linear valves 58, 60, 66 and 68 is set at the opened position, an effective valve-opening area in a corresponding one of the passages 62, 64, 67 and 69 is achieved by the related linear valve. The effective valve-opening area achieved by the related linear valve is varied proportionally to the level of the drive signal from the ECU 10.

By changing the level of the drive signal supplied to the pressure-up linear valve 58, a flow rate of the brake fluid fed from the high-pressure passage 50 into the front pressure passage 62 can be controlled such that the flow rate is linearly changed. By changing the level of the drive signal supplied to the pressure-down linear valve 66, a flow rate of the brake fluid fed from the front pressure passage 62 into the reservoir tank 28 can be controlled such that the flow rate is linearly changed. By changing the level of the drive signal supplied to the pressure-up linear valve 60, a flow rate of the brake fluid fed from the high-pressure passage 50 into the rear pressure passage 64 can be controlled such that the flow rate is linearly changed. By changing the level of the drive signal supplied to the pressure-down linear valve 68, a flow rate of the brake fluid fed from the rear pressure passage 64 into the reservoir tank 28 can be controlled such that the flow rate is linearly changed.

A front cut valve 70 (which will be called the FCV 70) is connected to the front pressure passage 62 at the end of the front pressure passage 62. The FCV 70 is connected at the other end to a front hydraulic circuit 72.

The FCV 70 is an electromagnetic flow control valve which is set at one of an opened position and a closed position. When a drive signal from the ECU 10 is not supplied to the FCV 70, the FCV 70 is always at the closed position so that a flow of the brake fluid from the front pressure passage 62 into the front hydraulic circuit 72 via the FCV 70 is inhibited. When the drive signal from the ECU 10 is supplied to the FCV 70, the FCV 70 is electrically set at the opened position, so that the brake fluid from the front pressure passage 62 is allowed to flow into the front hydraulic circuit 72 via the FCV 70.

In addition, the pressure passage 40 is connected to the front hydraulic circuit 72 via a connection passage 76. When the MCV 36 is set at the opened position, the master cylinder 14 and the front hydraulic circuit 72 are connected to each other via the pressure passage 40. In this condition, the brake fluid whose pressure is equal to the pressure Pmc is supplied from the master cylinder 14 to the front hydraulic circuit 72.

When the MCV 36 is set at the closed position, the master cylinder 14 and the front hydraulic circuit 72 are connected to each other via the bypass passage in which the check valve 38 is provided. In this condition, if the pressure Pmc is higher than a brake fluid pressure in the front hydraulic circuit 72, the brake fluid pressure in the front hydraulic circuit 72 is increased to the pressure Pmc. This brake fluid pressure a will be equal to the pressure Pmc. If the pressure Pmc is lower than the brake fluid pressure in the front hydraulic circuit 72, the brake fluid pressure in the front hydraulic circuit 72 is retained at the same level. This brake fluid pressure is different from the pressure Pmc.

A front wheel cylinder pressure sensor 74 (which will be called the Pf sensor 74) is connected to the connection passage 76 which interconnects the FCV 70 and the front hydraulic circuit 72. The Pf sensor 74 communicates with the pressure passage 40 via the connection passage 76. The Pf sensor 74 outputs a signal indicative of a brake fluid pressure in the connection passage 76. The signal output from the Pf sensor 74 is supplied to the ECU 10. The ECU 10 detects the present level of the brake fluid pressure in the connection passage 76 based on the signal from the Pf sensor 74.

The front hydraulic circuit 72 includes a pressure hold valve 78 and a check valve 80 which are provided in parallel. The pressure hold valve 78 and the check valve 80 are connected to a wheel cylinder 82 provided for a front left ("FL") wheel of the vehicle. The connection passage 76 is connected to the wheel cylinder 82 via the pressure hold valve 78 and the check valve 80.

The check valve 80 allows the flow of the brake fluid from the wheel cylinder 82 to the connection passage 76. The check valve 80 inhibits the flow of the brake fluid from the connection passage 76 to the wheel cylinder 82. The pressure hold valve 78 is an electromagnetic flow control valve which is set at one of an opened position and a closed position. When a drive signal from the ECU 10 is not supplied to the pressure hold valve 78, the pressure hold valve 78 is always at the opened position so that the brake fluid from the connection passage 76 is allowed to flow into the wheel cylinder 82 via the pressure hold valve 78. When the drive signal from the ECU 10 is supplied to the pressure hold valve 78, the pressure hold valve 78 is electrically set at the closed position, so that the flow of the brake fluid from the connection passage 76 to the wheel cylinder 82 via the pressure hold valve 78 is inhibited.

The front hydraulic circuit 72 includes a pressure hold valve 84 and a check valve 86 which are provided in parallel. The pressure hold valve 84 and the check valve 86 are connected to a wheel cylinder 88 provided for a front right ("FR") wheel of the vehicle. The connection passage 76 is connected to the wheel cylinder 88 via the pressure hold valve 84 and the check valve 86.

The check valve 86 allows the flow of the brake fluid from the wheel cylinder 88 to the connection passage 76. The check valve 86 inhibits the flow of the brake fluid from the connection passage 76 to the wheel cylinder 88. The pressure hold valve 84 is an electromagnetic flow control valve which is set at one of an opened position and a closed position. When a drive signal from the ECU 10 is not supplied to the pressure hold valve 84, the pressure hold valve 84 is always at the opened position so that the brake fluid from the connection passage 76 is allowed to flow into the wheel cylinder 88 via the pressure hold valve 84. When the drive signal from the ECU 10 is supplied to the pressure hold valve 84, the pressure hold valve 84 is electrically set at the closed position, so that the flow of the brake fluid from the connection passage 76 to the wheel cylinder 88 via the pressure hold valve 84 is inhibited.

The wheel cylinder 82 is connected to a low-pressure passage 94 via a pressure-down valve 90, and the wheel cylinder 88 is connected to the low-pressure passage 94 via a pressure-down valve 92. Each of the pressure-down valves 90 and 92 is an electromagnetic flow control valve which is electrically set at one of an opened position and a closed position. When signals from the ECU 10 are not supplied, the pressure-down valves 90 and 92 are always at the closed positions, so that the flow of the brake fluid from the wheel cylinders 82 and 88 into the low-pressure passage 94 via the pressure-down valves 90 and 92 is inhibited. When signals from the ECU 10 are supplied, the pressure-down valves 90 and 92 are set at the opened positions, so that the flow of the brake fluid from the wheel cylinders 82 and 88 into the low-pressure passage 94 via the pressure-down valves 90 and 92 is allowed.

A reservoir cut valve 96 (which will be called the RCV 96) is connected to the low-pressure passage 94 at the end of the low-pressure passage 94. The RCV 96 is connected at the other end to the reservoir tank 28 via a return passage 97. The RCV 96 is an electro-magnetic flow control valve which is electrically set at one of an opened position and a closed position. When a drive signal from the ECU 10 is not supplied, the RCV 96 is always at the closed position so that the flow of the brake fluid from the low-pressure passage 94 into the reservoir tank 28 via the RCV 96 is inhibited. When the drive signal from the ECU 10 is supplied, the RCV 96 is set at the opened position, so that the brake fluid from the low-pressure passage 94 is allowed to flow into the reservoir tank 28 via the RCV 96.

A rear wheel cylinder pressure sensor 98 (which will be called the Pr sensor 98) is connected to the rear pressure passage 64. The Pr sensor 98 outputs a signal indicative of a brake fluid pressure in the rear pressure passage 64. The signal output from the Pr sensor 98 is supplied to the ECU 10. The ECU 10 detects the present level of the brake fluid pressure in the rear pressure passage 64 based on the signal from the Pr sensor 98.

A rear cut valve 100 (which will be called the RCV 100) is connected to the rear pressure passage 64 at the end of the rear pressure passage 64. The RCV 100 is connected at the other end to a rear hydraulic circuit 102 via a connection passage 104.

The RCV 100 is an electromagnetic flow control valve which is electrically set at one of an opened position and a closed position. When a drive signal from the ECU 10 is not supplied to the RCV 100, the RCV 100 is always at the closed position so that the flow of the brake fluid from the rear pressure passage 64 into the rear hydraulic circuit 102 via the RCV 100 is inhibited. When the drive signal from the ECU 10 is supplied to the RCV 100, the RCV 100 is electrically set at the opened position, so that the brake fluid from the rear pressure passage 64 is allowed to flow into the rear hydraulic circuit 102 via the RCV 100.

The rear hydraulic circuit 102 includes a pressure hold valve 106 and a check valve 108 which are provided in parallel. The pressure hold valve 106 and the check valve 108 are connected to a wheel cylinder 110 provided for a rear left ("RL") wheel of the vehicle. The connection passage 104 is connected to the wheel cylinder 110 via the pressure hold valve 106 and the check valve 108.

The check valve 108 allows the flow of the brake fluid from the wheel cylinder 110 to the connection passage 104. The check valve 108 inhibits the flow of the brake fluid from the connection passage 104 to the wheel cylinder 110. The pressure hold valve 106 is an electromagnetic flow control valve which is electrically set at one of an opened position and a closed position. When a drive signal from the ECU 10 is not supplied to the pressure hold valve 106, the pressure hold valve 106 is always at the opened position so that the brake fluid from the connection passage 104 is allowed to flow into the wheel cylinder 110 via the pressure hold valve 106. When the drive signal from the ECU 10 is supplied to the pressure hold valve 106, the pressure hold valve 106 is electrically set at the closed position, so that the flow of the brake fluid from the connection passage 104 to the wheel cylinder 110 via the pressure hold valve 106 is inhibited.

The rear hydraulic circuit 102 includes a pressure hold valve 112 and a check valve 114 which are provided in parallel. The pressure hold valve 112 and the check valve 114 are connected to a wheel cylinder 116 provided for a rear right ("RR") wheel of the vehicle. The connection passage 104 is connected to the wheel cylinder 116 via the pressure hold valve 112 and the check valve 114.

The check valve 114 allows the flow of the brake fluid from the wheel cylinder 116 to the connection passage 104. The check valve 114 inhibits the flow of the brake fluid from the connection passage 104 to the wheel cylinder 116. The pressure hold valve 112 is an electromagnetic flow control valve which is electrically set at one of an opened position and a closed position. When a drive signal from the ECU 10 is not supplied to the pressure hold valve 112, the pressure hold valve 112 is always at the opened position so that the brake fluid from the connection passage 104 is allowed to flow into the wheel cylinder 116 via the pressure hold valve 112. When the drive signal from the ECU 10 is supplied to the pressure hold valve 112, the pressure hold valve 112 is electrically set at the closed position, so that the flow of the brake fluid from the connection passage 104 to the wheel cylinder 116 via the pressure hold valve 112 is inhibited.

The wheel cylinder 110 is connected to the low-pressure passage 94 via a pressure-down valve 118, and the wheel cylinder 116 is connected to the low-pressure passage 94 via a pressure-down valve 120. Each of the pressure-down valves 118 and 120 is an electromagnetic flow control valve which is electrically set at one of an opened position and a closed position. When signals from the ECU 10 are not supplied, the pressure-down valves 118 and 120 are always at the closed positions, so that the flow of the brake fluid from the wheel cylinders 110 and 116 into the low-pressure passage 94 via the pressure-down valves 118 and 120 is inhibited. When signals from the ECU 10 are supplied, the pressure-down valves 118 and 120 are set at the opened positions, so that the flow of the brake fluid from the wheel cylinders 110 and 116 into the low-pressure passage 94 via the pressure-down valves 118 and 120 is allowed.

In the brake system of FIG. 1, when a brake operating force Fp by the vehicle operator is placed onto the brake pedal 12, the brake fluid pressure in the first pressure chamber 22 and the brake fluid pressure in the second pressure chamber 24 are increased in response to the brake operating force Fp on the brake pedal 12.

When the brake fluid pressure in the second pressure chamber 24 of the master cylinder 14 is higher than the reference level, the pressure switch 32 outputs an ON signal to the ECU 10. The ECU 10 detects that the brake pedal 12 is set at the operated position or depressed by the vehicle operator, based on the ON signal from the pressure switch 32.

When the depression of the brake pedal 12 by the vehicle operator is detected, the ECU 10 supplies signals to the MCV 36, the FCV 70 and the RCV 10, so that the MCV 36 is set at the closed position, and the FCV 70 and the RCV 100 are set at the opened positions.

In this case, the flow of the brake fluid from the master cylinder 14 into the pressure passage 40 via the MCV 36 is inhibited. The brake fluid from the front pressure passage 62 is allowed to flow into the front hydraulic circuit 72 via the FCV 70. The pressure of the brake fluid supplied from the FCV 70 is adjusted to a pressure Pf by the pressure-up linear valve 58 and the pressure-down linear valve 66, and these linear valves 58 and 66 will be called the front linear valves 58 and 66. Further, the brake fluid from the rear pressure passage 64 is allowed to flow into the rear hydraulic circuit 102 via the RCV 100. The pressure of the brake fluid supplied from the RCV 100 is adjusted to a brake fluid pressure Pr by the pressure-up linear valve 60 and the pressure-down linear valve 68, and these linear valves 60 and 68 will be called the rear linear valves 60 and 68.

Under such conditions, the Pmc sensor 30 outputs a signal indicative of the pressure Pmc in the master cylinder 14 in response to the brake operating force Fp. The Pf sensor 74 outputs a signal indicative of the pressure Pf in the connection passage 76, the pressure Pf being adjusted by the front linear valves 58 and 66. The Pr sensor 98 outputs a signal indicative of the pressure Pr in the rear pressure passage 64 or the connection passage 104, the pressure Pr being adjusted by the rear linear valves 60 and 68.

Based on the signals from the Pmc sensor 30 and the Pf sensor 74, the ECU 10 controls the front linear valves 58 and 66 such that a pressure Pf is supplied by the front linear valves 58 and 66 and a ratio of the pressure Pf to the pressure Pmc is set at a predetermined constant. Based on the signals from the Pmc sensor 30 and the Pr sensor 98, the ECU 10 controls the rear linear valves 60 and 68 such that a pressure Pr is supplied by the rear linear valves 60 and 68 and a ratio of the pressure Pr to the pressure Pmc is set at a predetermined constant.

When a hydraulic brake control process is not performed by the hydraulic brake control apparatus, the pressure hold valves 78 and 84 are set at the opened positions and the pressure-down valves 90 and 92 are set at the closed positions. Under such conditions, the brake fluid pressure Pf in the connection passage 76 of the front hydraulic circuit 72 is supplied to the front wheel cylinders 82 and 88. The brake fluid pressure Pf in the front wheel cylinders 82 and 88 is adjusted such that a ratio of the pressure Pf to the master cylinder pressure Pmc (which varies in response to the brake operating force Fp) is set at a predetermined constant.

Similarly, when the hydraulic brake control process is not performed by the hydraulic brake control apparatus, the pressure hold valves 106 and 112 are set at the opened positions and the pressure-down valves 118 and 120 are set at the closed positions. Under such conditions, the brake fluid pressure Pr in the connection passage 104 of the rear hydraulic circuit 102 is supplied to the rear wheel cylinders 110 and 116. The brake fluid pressure Pr in the rear wheel cylinders 110 and 116 is adjusted such that a ratio of the pressure Pr to the master cylinder pressure Pmc (which varies in response to the brake operating force Fp) is set at a predetermined constant.

Accordingly, in the brake system of FIG. 1, it is possible to adjust the pressure Pf in the front wheel cylinders 82 and 88 and the pressure Pr in the rear wheel cylinders 110 and 116 such that the pressure Pf and the pressure Pr are set at predetermined values in response to the brake operating force Fp. A control procedure in which the above-described function is achieved by the brake system when the hydraulic brake control process is not performed will be called a normal control mode.

In the hydraulic brake control apparatus of the above-described embodiment, the front linear valves 58 and 66 can be controlled such that the ratio of the pressure Pf to the pressure Pmc is set at a predetermined constant which is independent of the pressure Pmc, and the rear linear valves 60 and 68 can be controlled such that the ratio of the pressure Pr to the pressure Pmc is set at a predetermined constant which is independent of the pressure Pmc. The pressure Pf from the front linear valves 58 and 66 is supplied to the connection passage 76 of the front hydraulic circuit 72 via the FCV 70, and the pressure Pr from the rear linear valves 60 and 68 is supplied to the connection passage 114 of the rear hydraulic circuit 102 via the RCV 100.

Therefore, in the hydraulic brake control apparatus of the above-described embodiment, the pressure Pf in the front wheel cylinders 82 and 88 can be suitably increased by controlling the front linear valves 58 and 66, and the pressure Pr in the rear wheel cylinders 110 and 116 can be suitably increased by controlling the rear linear valves 60 and 68. A control procedure in which the above-described function is achieved by the hydraulic brake control apparatus of the present embodiment will be called a pressure-increase control mode.

Further, in the hydraulic brake control apparatus of the above-described embodiment, when the pressure hold valve 78 is set at the closed position and the pressure-down valve 90 is set at the closed position, it is possible to continuously hold the pressure Pf in the wheel cylinder 82 at the same level. When the pressure hold valve 84 is set at the closed position and the pressure-down valve 92 is set at the closed position, it is possible to hold the pressure Pf in the wheel cylinder 88 at the same level. When the pressure hold valve 106 is set at the closed position and the pressure-down valve 118 is set at the closed position, it is possible to continuously hold the pressure Pr in the wheel cylinder 110 at the same level. When the pressure hold valve 112 is set at the closed position and the pressure-down valve 120 is set at the closed position, it is possible to continuously hold the pressure Pr in the wheel cylinder 116 at the same level.

Therefore, in the hydraulic brake control apparatus of the above-described embodiment, the pressure Pf in the front wheel cylinders 82 and 88 can be maintained at a desired level by controlling the pressure hold valves 78 and 84 and the pressure-down valves 90 and 92, and the pressure Pr in the rear wheel cylinders 110 and 116 can be maintained at a desired level by controlling the pressure hold valves 106 and 112 and the pressure-down valves 118 and 120. A control procedure in which the above-described function is achieved by the hydraulic brake control apparatus of the present embodiment will be called a pressure hold control mode.

Further, in the hydraulic brake control apparatus of the above-described embodiment, when the pressure hold valve 78 is set at the closed position and the pressure-down valve 90 and the RCV 96 are set at the opened positions, it is possible to suitably reduce the pressure Pf in the wheel cylinder 82. When the pressure hold valve 84 is set at the closed position and the pressure-down valve 92 and the RCV 96 are set at the opened positions, it is possible to suitably reduce the pressure Pf in the wheel cylinder 88. When the pressure hold valve 106 is set at the closed position and the pressure-down valve 118 and the RCV 96 are set at the opened positions, it is possible to suitably reduce the pressure Pr in the wheel cylinder 110. When the pressure hold valve 112 is set at the closed position and the pressure-down valve 120 and the RCV 96 are set at the closed positions, it is possible to suitably reduce the pressure Pr in the wheel cylinder 116.

Therefore, in the hydraulic brake control apparatus of the present embodiment, the pressure Pf in the front wheel cylinders 82 and 88 can be suitably reduced by controlling the pressure hold valves 78 and 84, the RCV 96 and the pressure-down valves 90 and 92, and the pressure Pr in the rear wheel cylinders 110 and 116 can be suitably reduced by controlling the pressure hold valves 106 and 112, the RCV 96 and the pressure-down valves 118 and 120. A control procedure in which the above-described function is achieved by the hydraulic brake control apparatus of the present embodiment will be called a pressure-decrease control mode.

The ECU 10 suitably carries out one of the normal control mode, the pressure-increase control mode, the pressure hold control mode and the pressure-decrease control mode of the brake system based on the operating conditions of the vehicle and the respective slip ratios of the FL, FR, RL and RR wheels of the vehicle. The normal control mode is carried out by the ECU 10 in order to achieve a hydraulic brake control function responsive to the brake operating force of the vehicle operator. The pressure-increase control mode, the pressure hold control mode and the pressure-decrease control mode in combination are carried out by the ECU 10 in order to achieve a hydraulic brake control function appropriate to ensure a vehicle running stability.

In the hydraulic brake control apparatus of the above-described embodiment, if a defect in the front linear valves 58 and 66 has occurred, the pressure Pf in the front wheel cylinders 82 and 88 cannot be suitably increased by controlling the front linear valves 58 and 66. The pressure Pf in the front wheel cylinders 82 and 88 provided for the FL and FR wheels of the vehicle cannot be increased, and it is difficult to reduce the stopping distance of the vehicle.

In order to avoid the difficulty, in the hydraulic brake control apparatus of the present embodiment, when a malfunction in the front linear valves 58 and 66 is detected, the ECU 10 sets the MCV 36 at the opened position and sets the FCV 70 at the closed position. The pressure Pf in the front wheel cylinders 82 and 88 can be increased to or maintained at the pressure Pmc from the MCV 36 by supplying the brake fluid pressure from the master cylinder 14 to the front hydraulic circuit 72 through the pressure passage 40. The pressure Pmc from the master cylinder 14 is supplied to the wheel cylinders 82 and 88 through the pressure passage 40.

Therefore, in the hydraulic brake control apparatus of the present embodiment, when a defect in front linear valves 58 and 66 is detected, it is possible to supply the brake fluid pressure, which is responsive to the brake operating force Fp, to the wheel cylinders 82 and 88. Therefore, if the front linear valves 58 and 66 are defective, it is possible that the hydraulic brake control apparatus of the present embodiment safely produce an adequate braking force on the vehicle.

Further, in the hydraulic brake control apparatus of the above-described embodiment, a defect in the brake fluid paths between the master cylinder 14, the linear valves 58, 60, 66 and 68, and the wheel cylinders 82, 88, 110 and 116 may take place. If the supply of the brake fluid which is the same as that of the normal case is maintained when the defect in the brake fluid paths has occurred, the brake fluid in the hydraulic brake control apparatus may leak out. If the supply of the brake fluid is stopped when the defect in the brake fluid paths has occurred, it is difficult for the hydraulic brake control apparatus to reduce the stopping distance of the vehicle.

The hydraulic brake control process of the present invention provides a fail-safe brake system in which, when a defect in the brake system has occurred, a specific location of the defect in the brake fluid paths of the brake system can be detected and a fail-safe function appropriate for the specific location of the defect can be achieved.

Next, a description will be given of the hydraulic brake control process performed by the hydraulic brake control apparatus of the present embodiment.

Figure 2A:
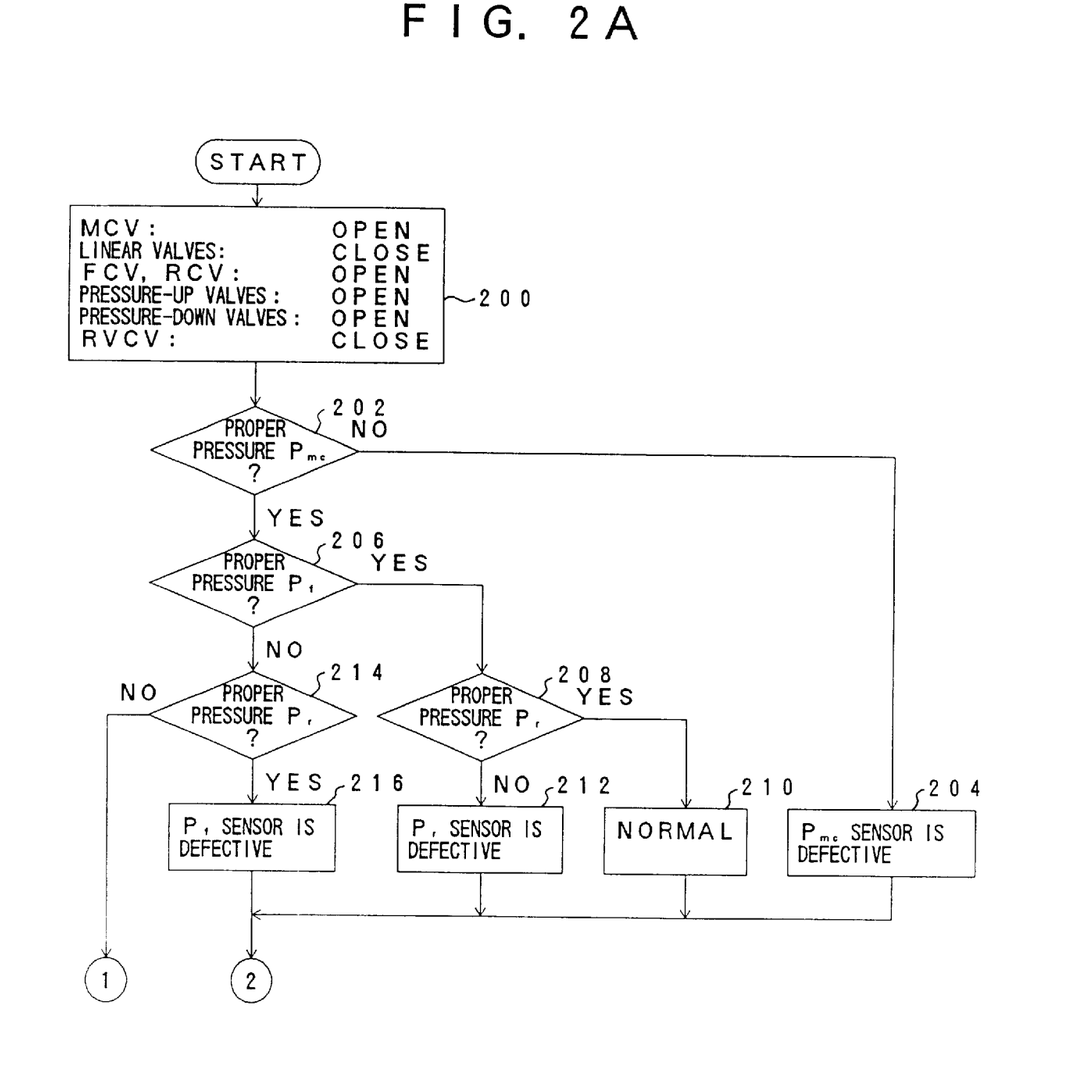
FIGS. 2A and 2B are a flowchart for explaining an initial routine executed by a control unit of the brake system of FIG. 1.
Figure 2B:
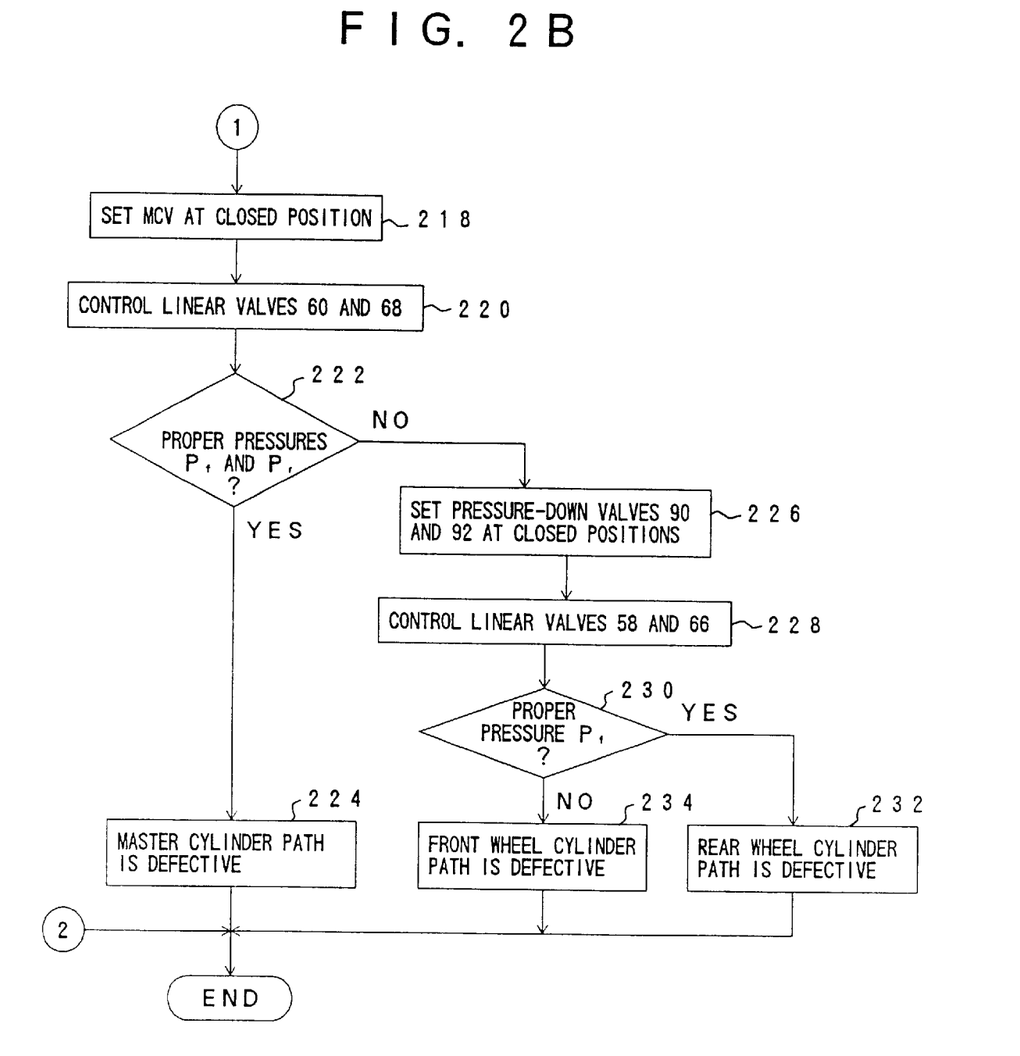

FIGS. 2A and 2B show an initial routine of the hydraulic brake control process executed by the ECU 10 of the brake system of FIG. 1. The initial routine of FIGS. 2A and 2B is executed in order to detect whether a defect in the brake system has occurred, and to detect a specific location of the defect in the brake fluid paths of the brake system if the defect has occurred.

The execution of the initial routine of FIGS. 2A and 2B is started after an ignition switch (not shown) of the vehicle is turned ON and the brake pedal 12 is depressed by the vehicle operator.

As shown in FIG. 2A, the ECU 10 at step 200 sets the MCV 36 at the opened position, sets the linear valves 58, 60, 66 and 68 at the closed positions, sets the FCV 70 and the RCV 100 at the opened positions, sets the pressure hold valves 78, 84, 106 and 112 at the opened positions, sets the pressure-down valves 90, 92, 118 and 120 at the opened position, and sets the RCV 96 at the closed position.

After the step 200 is performed, the master cylinder pressure Pmc produced in the master cylinder 14 is supplied to the front hydraulic circuit 72 through the pressure passages 34 and 40. The master cylinder pressure Pmc is further supplied to the pressure hold valves 78 and 84 and the pressure-down valves 90 and 92. Further, the master cylinder pressure Pmc is supplied to the rear hydraulic circuit 102 through the pressure-down valves 118 and 120. Under such conditions, if no defect in the brake fluid paths of the brake system occurs, it should be detected that the output signals of the Pmc sensor 30, the Pf sensor 74 and the Pr sensor 98 indicate the same master cylinder pressure Pmc.

After the step 200 is performed, step 202 detects whether the output signal of the Pmc sensor 30 indicates a proper pressure Pmc (which is the same as the master cylinder pressure Pmc mentioned above). As described above, the execution of the initial routine is started when the brake pedal 12 is depressed, and the ECU 10 detects the depression of the brake pedal 12 when the ON signal is output by the pressure switch 32 or when the brake fluid pressure in the master cylinder 14 is higher than the reference level. Therefore, when it is detected at the step 202 that the output signal of the Pmc sensor 30 does not indicate a proper pressure Pmc, it is determined that a defect in the Pmc sensor 30 has occurred.

When the result at the step 202 is negative, step 204 sets a Pmc sensor error flag in an ON state, which indicates the occurrence of the defect in the Pmc sensor 30. After the step 204 is performed, the initial routine at the present cycle ends.

On the other hand, when the result at the step 202 is affirmative, step 206 is executed by the ECU 10.

Step 206 detects whether the output signal of the Pf sensor 74 indicates a proper pressure Pf (which is the same as the master cylinder pressure Pmc mentioned above). When the result at the step 206 is affirmative, step 208 is executed by the ECU 10.

Step 208 detects whether the output signal of the Pr sensor 98 indicates a proper pressure Pr (which is the same as the master cylinder pressure Pmc mentioned above). When the result at the step 208 is affirmative, step 210 is executed by the ECU 10.

As described above, after the step 200 is performed, if the brake fluid paths in the brake system are proper, the brake fluid pressure Pmc from the master cylinder 14 is supplied to both the front hydraulic circuit 72 and the rear hydraulic circuit 102. If the brake fluid paths are proper and the Pf sensor 74 and the Pr sensor 98 are proper, it should be detected that the output signals of the Pf sensor 74 and the Pr sensor 98 after the step 200 is performed indicate the proper pressures which are the same as the master cylinder pressure Pmc.

When all the results at the steps 202, 206 and 208 are affirmative, it is determined that the Pmc sensor 30, the Pf sensor 74 and the Pr sensor 98 are proper and the brake fluid paths of the brake system are proper. In this case, step 210 is executed by the ECU 10.

Step 210 sets a normal flag in an ON state, which indicates that the brake system normally operates. After the step 210 is performed, the initial routine at the present cycle ends.

When the result at the step 206 is affirmative and the result at the step 208 is negative, it is determined that the Pf sensor 74 is proper and a defect in the Pr sensor 98 has occurred. In this case, step 212 is executed by the ECU 10.

Step 212 sets a Pr sensor error flag in an ON state, which indicates the occurrence of the defect in the Pr sensor 98. After the step 212 is performed, the initial routine at the present cycle ends.

When the result at the step 206 is negative, it is determined that a defect in the Pf sensor 74 or a defect in the brake fluid paths of the brake system has occurred. In this case, step 214 is executed by the ECU 10.

Step 214 detects whether the output signal of the Pr sensor 98 indicates a proper pressure Pr (which is the same as the master cylinder pressure Pmc mentioned above). When the result at the step 214 is affirmative, it is determined that the Pr sensor 98 is proper and a defect in the Pf sensor 74 has occurred. In this case, step 216 sets a Pf sensor error flag in an ON state, which indicates the occurrence of the defect in the Pf sensor 74. After the step 216 is performed, the initial routine at the present cycle ends.

When the result at the step 214 is negative, it is determined that a defect in the Pf sensor 74, a defect in the Pr sensor 98, or a defect in the brake fluid paths of the brake system has occurred. In this case, step 218 and subsequent steps, which are shown in FIG. 2B, are executed by the ECU 10.

As shown in FIG. 2B, step 218 supplies the drive signal to the MCV 36 so that the MCV 36 is set at the closed position. The flow of the brake fluid from the master cylinder 14 into the pressure passage 40 via the MCV 36 is inhibited. The pressure passage 34 and the master cylinder 14 are separated from the front hydraulic circuit 72.

Step 220 controls the rear linear valves 60 and 68 by supplying the drive signals thereto such that an appropriate level of the pressure Pr is supplied by the rear linear valves 60 and 68 and the ratio of the pressure Pr to the pressure Pmc is set at the predetermined constant. The pressure Pr from the linear valves 60 and 68 is supplied to the rear hydraulic circuit 102 through the RCV 100. The pressure Pr is further supplied to pressure-down valves 118 and 120 and the pressure-down valves 90 and 92. Further, the pressure Pr is supplied to the front hydraulic circuit 72 through the pressure-down valves 90 and 92.

Step 222 detects whether the output signals of the Pf sensor 74 and the Pr sensor 98 indicate the proper pressures Pf and Pr. Under the above conditions, if no defect in the front hydraulic circuit 72 occurs and no defect in the rear hydraulic circuit 102 occurs, it should be detected that the output signals of the Pf sensor 74 and the Pr sensor 98 after the step 220 is performed indicate the proper pressures Pf and Pr which are the same as the pressure Pr mentioned above.

Therefore, when the result at the step 222 is affirmative, it is determined that the front hydraulic circuit 72 and the rear hydraulic circuit 102 are proper. Further, when the result at the step 222 is affirmative, it is determined that the Pf sensor 74 and the Pr sensor 98 are proper.

As described above, the step 222 is performed when it is determined that a defect in the Pf sensor 74, a defect in the Pr sensor 98, or a defect in the brake fluid paths of the brake system has occurred. In this case, the front hydraulic circuit 72 and the rear hydraulic circuit 102 are determined to be proper, the Pf sensor 74 and the Pr sensor 98 are determined to be proper. Therefore, when the result at the step 222 is affirmative, it is determined that a defect in the master cylinder 14 or a defect in the pressure passage 34 between the master cylinder 14 and the MCV 36 has occurred. In this case, step 224 is executed by the ECU 10. Hereinafter, the brake fluid path including the master cylinder 14 and the pressure passage 34 will be called the master cylinder path, and this kind of defect will be called the master cylinder path defect.

When the result at the step 222 is affirmative, step 224 sets a master cylinder path error flag in an ON state, which indicates the occurrence of the defect in the master cylinder path. After the step 224 is performed, the initial routine at the present cycle ends.

On the other hand, when the result at the step 222 is negative, it is determined that a defect in the front hydraulic circuit 72 or the rear hydraulic circuit 102 has occurred, or a defect in the Pf sensor 74 and the Pr sensor 98 has occurred. In this case, step 226 is executed by the ECU 10.

Step 226 sets the pressure-down valves 90 and 92 at the closed positions. After the step 226 is performed, the flow of the brake fluid from the front hydraulic circuit 72 into the rear hydraulic circuit 102 is inhibited or shut off by the pressure-down valves 90 and 92. After the step 226 is performed, step 228 is executed by the ECU 10.

Step 228 controls the front-wheel linear valves 58 and 66 by supplying the drive signals thereto such that an appropriate level of the brake fluid pressure Pf in the front hydraulic circuit 72 is produced by the linear valves 58 and 66. The brake fluid pressure Pf from the linear valves 58 and 66 is supplied to the front hydraulic circuit 72 through the FCV 72. After the step 228 is performed, step 230 is executed by the ECU 10.

Step 230 detects whether the output signal of the Pf sensor 74 indicates a proper pressure Pf (which is the same as the pressure Pf mentioned above). When the so result at the step 230 is affirmative, it is determined that no defect in the Pf sensor 74 occurs and no defect in the brake fluid path in the front hydraulic circuit 72 connected to the rear wheel cylinders 110 and 116 occurs. In other words, it is determined that a defect in the brake fluid path in the rear hydraulic circuit 102 connected to the rear wheel cylinders 110 and 116 or a defect in the Pr sensor 98 has occurred. In this case, step 232 is executed by the ECU 10. Hereinafter, the brake fluid path in the rear hydraulic circuit 102 connected to the rear wheel cylinders 110 and 116 will be called the rear wheel cylinder path, and this kind of defect will be called the rear wheel cylinder path defect.

When the result at the step 230 is affirmative, step 232 sets a rear path error flag in an ON state, which indicates the occurrence of the defect in the rear wheel cylinder path. After the step 232 is performed, the initial routine at the present cycle ends.

On the other hand, when the result at the step 230 is negative, it is determined that a defect in the brake fluid path in the front hydraulic circuit 72 connected to the front wheel cylinders 82 and 88 or a defect in the Pf sensor 74 has occurred. In this case, step 234 is executed by the ECU 10. Hereinafter, the brake fluid path in the front hydraulic circuit 72 connected to the front wheel cylinders 82 and 88 will be called the front wheel cylinder path, and this kind of defect will be called the front wheel cylinder path defect.

Step 234 sets a front path error flag in an ON state, which indicates the occurrence of the defect in the front wheel cylinder path. After the step 234 is performed, the initial routine at the present cycle ends.

According to the initial routine of FIGS. 2A and 2B, each time the ignition switch is turned ON, it is possible to detect whether a defect in the brake system has occurred, and it is possible to detect the specific location of the defect in the brake fluid paths of the brake system if the defect has occurred.

Figure 3A:
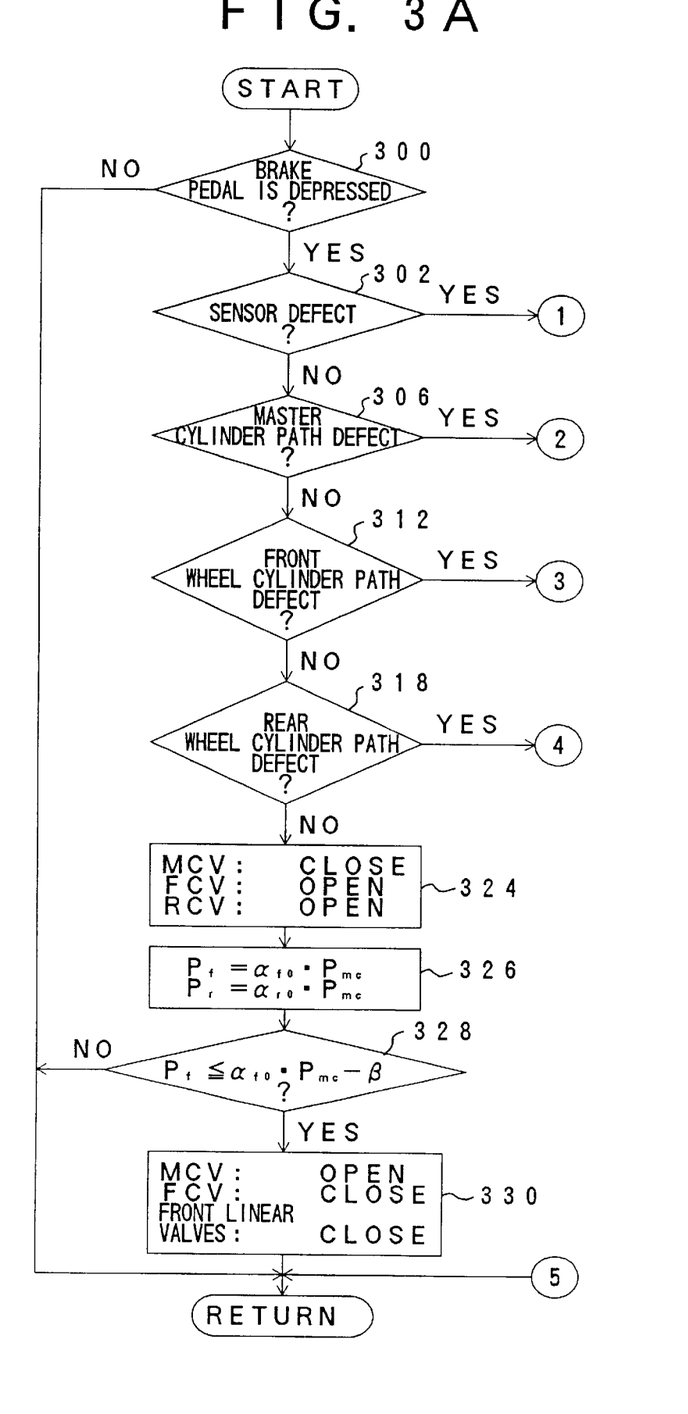
FIGS. 3A and 3B are a flowchart for explaining a main routine executed by the control unit of the brake system of FIG. 1.
Figure 3B:
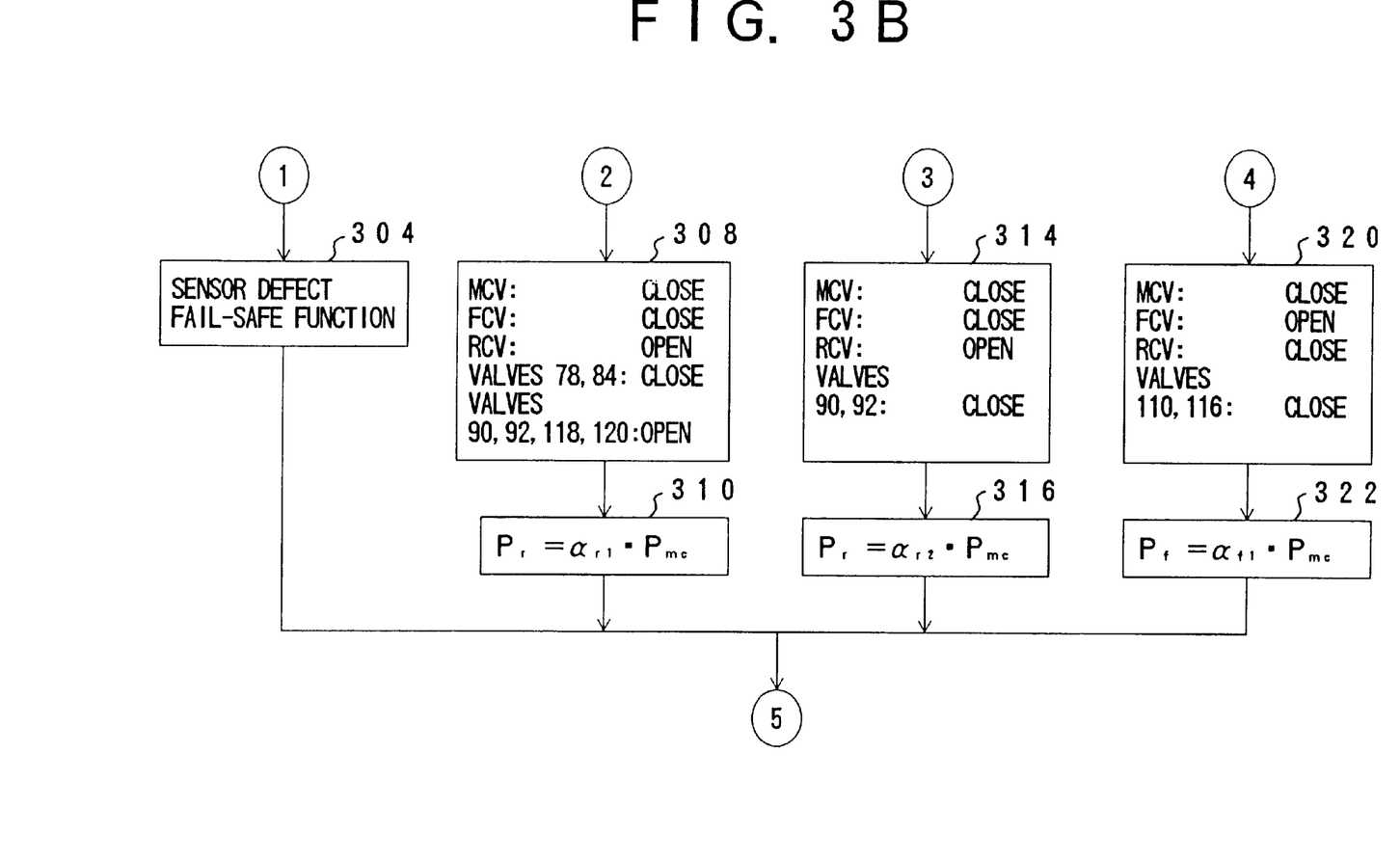

FIGS. 3A and 3B show a main routine of the hydraulic brake control process executed by the ECU 10 of the brake system of FIG. 1. The main routine of FIGS. 3A and 3B is executed in order to carry out the normal control mode when no defect in the brake system occurs, and to carry out an appropriate fail-safe function based on the specific location of the defect when the occurrence of the defect in the brake fluid paths of the brake system is detected.

The execution of the main routine of FIGS. 3A and 3B is started by interrupts which are issued at regular time intervals.

As shown in FIG. 3A, the ECU 10 at step 300 detects whether the brake pedal 12 is depressed by the vehicle operator. As described above, when the ON signal from the pressure switch 32 is supplied to the ECU 10 or when the pressure Pmc detected by the Pmc sensor 30 is higher than a reference level, it is detected that the brake pedal 12 is depressed by the vehicle operator.

When the result at the step 300 is negative, the subsequent steps are not performed and the main routine at the present cycle ends. When the result at the step 300 is affirmative, step 302 is executed by the ECU 10.

Step 302 detects whether one of the Pmc sensor error flag, the Pf sensor error flag and the Pr sensor error flag is set in the ON state by the initial routine. When the result at the step 302 is affirmative, step 304 (shown in FIG. 3B) is executed by the ECU 10. This kind of defect will be called the sensor defect. In the step 304, a fail-safe function appropriate to deal with the sensor defect is carried out as follows.

When a defect in the Pmc sensor 30 has occurred (or when the Pmc sensor error flag is set in the On state), the brake fluid control using the linear valves 58, 60, 66 and 68 cannot be performed. In this case, the flow of the brake fluid from the master cylinder 14 to the wheel cylinders 82, 88, 110 and 116 is allowed by the ECU 10 at the step 304. After the step 304 is performed, the wheel cylinder pressure Pwc in each of the wheel cylinders 82, 88, 110 and 116 can be made to be the same as the pressure Pmc in the master cylinder 14.

When a defect in one of the Pf sensor 74 and the Pr sensor 98 has occurred (or when one of the Pf sensor error flag and the Pr sensor error flag is set in the On state), the ECU 10 at the step 304 sets the pressure-down valves 90, 92, 110 and 116 at the opened positions, and controls the linear valves 58, 60, 66 and 68 such that the ratio of the pressure (detected by the normal one of the Pf sensor 74 and the Pr sensor 98) to the pressure Pmc (detected by the Pmc sensor 30) is set at the predetermined constant related to the normal one of the pressure Pf and the pressure Pr. After the step 304 is performed, the wheel cylinder pressure Pwc in each of the wheel cylinders 82, 88, 110 and 116 can be made to be accurately equal to the brake operating force Fp multiplied by the predetermined constant related to the normal pressure.

After the step 304 is performed, the main routine of FIGS. 3A and 3B at the present cycle ends.

When the result at the step 302 is negative, the sensor defect related to the Pmc sensor 30, the Pf sensor 74 and the Pr sensor 98 is not detected. Step 306 is executed by the ECU 10. Step 306 detects whether the master cylinder path error flag is set in the ON state by the initial routine.

When the result at the step 306 is affirmative, it is determined that the master cylinder path is defective. Steps 308 and 310 (shown in FIG. 3B) are executed by the ECU 10.

Step 308 sets the MCV 36 at the closed position, sets the FCV 70 at the closed position, sets the RCV 100 at the opened position, sets the front pressure hold valves 78 and 84 at the closed positions, and sets the pressure-down valves 90, 92, 118 and 120 at the opened positions. After the step 308 is performed, the flow of the brake fluid from the connection passage 76 of the front hydraulic circuit 72 into the front wheel cylinders 82 and 88 through the front pressure hold valves 78 and 84 is inhibited, and the flow of the brake fluid from the rear hydraulic circuit 102 into the front wheel cylinders 82 and 88 through the pressure-down valves 90, 92, 118 and 120 is allowed.

When the master cylinder path is defective, air from the master cylinder path may enter the pressure passage 40 or the connection passage 76. If the pressure Pf from the connection passage 76 is supplied to the wheel cylinders 82 and 88 under such conditions, the air may enter the brake fluid paths of the front hydraulic circuit 72 connected to the wheel cylinders 82 and 88. In order to avoid this, the step 308 is performed so that the pressure Pr from the rear hydraulic circuit 102, instead of the pressure Pf from the connection passage 76, is supplied to the front wheel cylinders 82 and 88 without causing the entry of the air into the brake fluid paths of the front hydraulic circuit 72. After the step 308 is performed, step 310 is executed by the ECU 10.

Step 310 controls the rear linear valves 60 and 68 such that the pressure Pr (detected by the Pr sensor 98) is supplied by the rear linear valves 60 and 68 and the ratio of the pressure Pr to the pressure Pmc (detected by the Pmc sensor 30) is set at a predetermined constant $\alpha_{r1}$. After the step 310 is performed, the equation $Pr=\alpha_{r1}\cdot Pmc$ is satisfied.

Therefore, when the master cylinder path is defective, the pressure Pr, which is equal to the master cylinder pressure Pmc multiplied by the constant $\alpha_{r1}$, can be supplied by the rear linear valves 60 and 68, and the pressure Pr from the rear linear valves 60 and 68 can be supplied to the wheel cylinders 82, 88, 110 and 116. The entry of air from the master cylinder path into the brake fluid paths of the front hydraulic circuit 72 connected to the front wheel cylinders 82 and 88 is safely avoided. An adequate level of the wheel cylinder pressure Pwc in the wheel cylinders 82, 88, 110 and 116 can be produced by the supplied pressure Pr. After the step 310 is performed, the main routine at the present cycle ends.

When the result at the step 306 is negative, it is determined that no defect in the master cylinder path occurs. In this case, step 312 is executed by the ECU 10. Step 312 detects whether the front path error flag is set in the ON state by the initial routine.

When the result at the step 312 is affirmative, it is determined that the front wheel cylinder path is defective. Steps 314 and 316 (shown in FIG. 3B) are executed by the ECU 10.

Step 314 sets the MCV 36 at the closed position, sets the FCV 70 at the closed position, sets the RCV 100 at the opened position, and sets the front pressure-down valves 90 and 92 at the closed positions. After the step 314 is performed, the flow of the brake fluid from the connection passage 76 of the front hydraulic circuit 72 into the front wheel cylinders 82 and 88 through the FCV 70 is inhibited, and the flow of the brake fluid from the rear hydraulic circuit 102 into the front wheel cylinders 82 and 88 through the pressure-down valves 90 and 92 is inhibited.

If the brake fluid pressure from the master cylinder 14 or the front linear valves 58 and 66 is supplied to the front wheel cylinders 82 and 88 when the front wheel cylinder path is defective, the brake fluid may leak out of the defective path. In order to avoid this, the step 314 is performed so that the supply of the brake fluid pressure to the front wheel cylinders 82 and 88 through the MCV 36 or the FCV 70 is inhibited. After the step 314 is performed, step 316 is executed by the ECU 10.

Step 316 controls the rear linear valves 60 and 68 such that the pressure Pr (detected by the Pr sensor 98) is supplied by the rear linear valves 60 and 68 and the ratio of the pressure Pr to the pressure Pmc (detected by the Pmc sensor 30) is set at a predetermined constant $\alpha_{r2}$. After the step 316 is performed, the equation $Pr=\alpha_{r2}\cdot Pmc$ is satisfied.

Therefore, when the front wheel cylinder path is defective, the pressure Pr, which is equal to the master cylinder pressure Pmc multiplied by the constant $\alpha_{r2}$, can be supplied by the rear linear valves 60 and 68, and the pressure Pr from the rear linear valves 60 and 68 can be supplied to the rear wheel cylinders 110 and 116 through the RCV 100. The leak of the brake fluid at the front wheel cylinder path can be safely avoided. An adequate level of the wheel cylinder pressure Pwc in the rear wheel cylinders 110 and 116 can be produced by the supplied pressure Pr. After the step 316 is performed, the main routine at the present cycle ends.

When the result at the step 312 is negative, it is determined that no defect in the front wheel cylinder path occurs. In this case, step 318 is executed by the ECU 10. Step 318 detects whether the rear path error flag is set in the ON state by the initial routine.

When the result at the step 318 is affirmative, it is determined that the rear wheel cylinder path is defective. Steps 320 and 322 (shown in FIG. 3B) are executed by the ECU 10.

Step 320 sets the MCV 36 at the closed position, sets the FCV 70 at the opened position, sets the RCV 100 at the closed position, and sets the rear pressure-down valves 118 and 120 at the closed positions. After the step 320 is performed, the flow of the brake fluid from the connection passage 104 of the rear hydraulic circuit 102 into the rear wheel cylinders 110 and 116 through the RCV 100 is inhibited, and the flow of the brake fluid from the front hydraulic circuit 72 into the rear wheel cylinders 110 and 116 through the rear pressure-down valves 118 and 120 is inhibited.

If the brake fluid pressure from the rear linear valves 60 and 68 is supplied to the rear wheel cylinders 110 and 116 when the rear wheel cylinder path is defective, the brake fluid may leak out of the defective path. In order to avoid this, the step 320 is performed so that the supply of the brake fluid pressure to the rear wheel cylinders 110 and 116 through the RCV 100 is inhibited. After the step 320 is performed, step 322 is executed by the ECU 10.

Step 322 controls the front linear valves 58 and 66 such that the pressure Pf (detected by the Pf sensor 74) is supplied by the front linear valves 58 and 66 and the ratio of the pressure Pf to the pressure Pmc (detected by the Pmc sensor 30) is set at a predetermined constant $\alpha_{f1}$. After the step 322 is performed, the equation Pf=$\alpha_{f1}$·Pmc is satisfied.

Therefore, when the rear wheel cylinder path is defective, the pressure Pf, which is equal to the master cylinder pressure Pmc multiplied by the constant $\alpha_{f1}$, can be supplied by the front linear valves 58 and 66, and the pressure Pf from the front linear valves 58 and 66 can be supplied to the front wheel cylinders 82 and 88 through the FCV 70. The leak of the brake fluid at the rear wheel cylinder path can be safely avoided. An adequate level of the wheel cylinder pressure Pwc in the front wheel cylinders 82 and 88 can be produced by the supplied pressure Pf. After the step 322 is performed, the main routine at the present cycle ends.

When the result at the step 318 is negative, it is determined that no defect in the brake system occurs. In this case, step 324 is executed by the ECU 10. Step 324 carries out the normal control mode. In the step 324, the MCV 36 is set at the closed position, the FCV 70 is set at the opened position, and the RCV 100 is set at the opened position. After the step 324 is performed, step 326 is executed by the ECU 10.

Step 326 controls the front linear valves 58 and 66 such that the pressure Pf (detected by the Pf sensor 74) is supplied by the front linear valves 58 and 66 and the ratio of the pressure Pf to the pressure Pmc (detected by the Pmc sensor 30) is set at a predetermined constant $\alpha_{f0}$. Further, step 326 controls the rear linear valves 60 and 68 such that the pressure Pr (detected by the Pr sensor 98) is supplied by the rear linear valves 60 and 68 and the ratio of the pressure Pr to the pressure Pmc is set at a predetermined constant $\alpha_{r0}$. After the step 326 is performed, the equations: Pf=$\alpha_{f0}$·Pmc and Pr=$\alpha_{r0}$·Pmc are satisfied.

Therefore, when no defect in the brake system occurs, the pressure Pf, which is equal to the master cylinder pressure Pmc multiplied by the constant $\alpha_{f0}$, can be supplied by the front linear valves 58 and 66, and the pressure Pf from the front linear valves 58 and 66 can be supplied to the front wheel cylinders 82 and 88 through the FCV 70. An adequate level of the wheel cylinder pressure Pwc in the front wheel cylinders 82 and 88 can be produced by the supplied pressure Pf. Further, the pressure Pr, which is equal to the master cylinder pressure Pmc multiplied by the constant $\alpha_{r0}$, can be supplied by the rear linear valves 60 and 68, and the pressure Pr from the rear linear valves 60 and 68 can be supplied to the rear wheel cylinders 110 and 116 through the RCV 100. An adequate level of the wheel cylinder pressure Pwc in the rear wheel cylinders 110 and 116 can be produced by the supplied pressure Pr. After the step 328 is performed, step 328 is executed by the ECU 10.

Step 328 detects whether the pressure Pf detected by the Pf sensor 74 is excessively small in comparison with the supplied pressure "$\alpha_{f0}$·Pmc". That is, it is detected at the step 328 whether the condition: Pf$\leq\alpha_{f0}$·Pmc−β (where β is a predetermined value) is satisfied.

When the result at the step 328 is negative, it is determined that the pressure Pf is properly supplied by the front linear valves 58 and 66. In this case, the main routine at the present cycle ends.

On the other hand, when the result at the step 328 is affirmative, it is determined that the pressure Pf is not properly supplied by the front linear valves 58 and 66. In this case, step 330 is executed by the ECU 10 in order to achieve a fail-safe function against a defect in the front linear valves 58 and 66.

Step 330 sets the MCV 36 at the opened position, sets the FCV 70 at the closed position, and sets the front linear valves 58 and 66 at the closed positions. After the step 330 is performed, the flow of the brake fluid from the front linear valves 58 and 66 into the front wheel cylinders 82 and 88 through the FCV 70 is inhibited, and the flow of the brake fluid from the master cylinder 14 into the front wheel cylinders 82 and 88 through the MCV 36 is allowed.

Therefore, when the pressure Pf is not properly supplied by the front linear valves 58 and 66, the brake fluid pressure, which is the same as the master cylinder pressure Pmc in the master cylinder 14, can be supplied by the MCV 36, and the pressure from the MCV 36 can be supplied to the front wheel cylinders 82 and 88. An adequate level of the wheel cylinder pressure Pwc in the front wheel cylinders 82 and 88 can be produced by the supplied pressure Pmc. After the step 320 is performed, the main routine at the present cycle ends.

As described above, in the hydraulic brake control apparatus of the above-described embodiment, each of the MCV 36, the FCV 70 and the RCV 100 is set at one of the opened position and the closed position in response to the drive signal from the ECU 10. When the MCV 36 is set at the opened position or the closed position, the flow of the brake fluid from the master cylinder 14 into the wheel cylinders is allowed or inhibited. When the FCV 70 (or the RCV 100) is set at the opened position or the closed position, the flow of the brake fluid from the front linear valves 58 and 66 (or the rear linear valves 60 and 68) into the wheel cylinders is allowed or inhibited.

If the brake fluid pressure is supplied to the wheel cylinders when a defect in the brake fluid path between the MCV 36 and the wheel cylinders has occurred or a defect in the brake fluid path between the FCV 70 (or the RCV 100) and the wheel cylinders has occurred, the leak of the brake fluid from the defective path may occur. The ECU 10 inhibits the supply of the brake fluid pressure to the wheel cylinders under such conditions, and it is possible to avoid the leak of the brake fluid from the defective path.

When a defect in one of the first brake fluid path between the master cylinder 14 and the MCV 36 and the second brake fluid path between the linear valves 58 and 66 (or the linear valves 60 and 68) and the FCV 70 (or the RCV 100) has occurred, the ECU 10 inhibits the flow of the brake fluid from one of the master cylinder 14 and the linear valves 58 and 66 (or the linear valves 60 and 68) connected to the defective path, into the wheel cylinders, and allows the flow of the brake fluid from the other of the master cylinder 14 and the linear valves 58 and 66 (or the linear valves 60 and 68) connected to the normal path, into the wheel cylinders. Therefore, the brake fluid pressure from the other pressure supplying unit is supplied to the wheel cylinders through the normal path.

Accordingly, in the hydraulic brake control apparatus of the above-described embodiment, it is possible to effectively supply an adequately high brake fluid pressure from one of the two pressure supplying units to the wheel cylinders without causing the leak of the brake fluid from the defective path when the defect in one of the first brake fluid path and the second brake fluid path has occurred. Therefore, the hydraulic brake control apparatus of the above-described embodiment enables the brake system to effectively produce an adequately great braking force on the vehicle.

Alternatively, in the hydraulic brake control apparatus of the present embodiment, a single flow control unit, for example, a three-position valve with three ports, may be used instead of the MCV 36 and the FCV 70.

Further, the present invention is not limited to the above-described embodiment, and variations and modifications may be made without departing from the present invention.

What is claimed is:

1. All apparatus for supplying brake fluid to a plurality of wheel cylinders comprising:
   a first pressure supplying unit supplying brake fluid pressure to the wheel cylinders via a first flow control unit, the first pressure supplying unit being connected to the first flow control unit via a first upstream flow path and the first flow control unit being connected to the wheel cylinders via a first downstream flow path;
   a second pressure supplying unit supplying brake fluid pressure to the wheel cylinders via a second flow control unit, the second pressure supplying unit being connected to the second flow control unit via a second upstream flow path and the second flow control unit being connected to the wheel cylinders via a second downstream flow path;
   a pressure supply inhibiting unit for inhibiting the supply of the brake fluid pressure to the wheel cylinders by the first pressure supplying unit when a defect in the first downstream flow path has occurred, and for inhibiting the supply of brake fluid pressure to the wheel cylinders by the second pressure supplying unit when a defect in the second downstream flow path has occurred; and
   a pressure supply path control unit for controlling the first and second flow control units so that, when a defect in one of the first upstream flow path and the second upstream flow path has occurred, the supply of brake fluid from the one of the first and second pressure supplying units connected to the one of the first and second upstream flow paths in which the defect occurred is inhibited and the supply of brake fluid from the other of the first and second pressure supplying units is allowed.

2. The apparatus according to claim 1, further comprising a first defect locating unit for determining, based on a brake fluid pressure measured in the second upstream flow path, whether a defect has occurred in the first upstream flow path.

3. The apparatus according to claim 2, wherein the first defect locating unit determines that a defect in the first brake fluid path has occurred when a first value of the brake fluid pressure measured after the first flow control unit is closed and brake fluid pressure is supplied to the wheel cylinders from the second pressure supplying unit, is higher than a second value of the brake fluid pressure measured after the first flow control unit is opened and brake fluid pressure is supplied to the wheel cylinders from the first pressure supplying unit.

4. The hydraulic brake control apparatus according to claim 1, wherein the first pressure supplying unit comprises a master cylinder, and the first flow control unit comprises a flow control valve provided between the master cylinder and the wheel cylinder, the flow control valve being electrically set at one of an opened position and a closed position.

5. The hydraulic brake control apparatus according to claim 1, wherein the second pressure supplying unit comprises a pump with an actuating motor, and a linear valve connected to the pump, and the second flow control unit comprises a flow control valve provided between the linear valve and the wheel cylinder, the flow control valve being electrically set at one of an opened position and a closed position.

6. The hydraulic brake control apparatus according to claim 1, wherein the second pressure supplying unit comprises a pump with an actuating motor, and a plurality of linear valves connected to the pump, and the second flow control unit comprises a front flow control valve and a rear flow control valve, the front flow control valve provided between the linear valves and a front hydraulic circuit including front wheel cylinders among said wheel cylinders, and the rear flow control valve provided between the linear valves and a rear hydraulic circuit including rear wheel cylinders among said wheel cylinders.

7. The apparatus according to claim 1, wherein the pressure supply path control unit controls the second pressure supplying unit, when a defect has occurred in the first upstream flow path, such that a brake fluid pressure supplied to the wheel cylinders by the second pressure supplying unit is equal to the brake fluid pressure supplied by the first pressure supplying unit multiplied by a predetermined constant.

8. The apparatus according to claim 1, wherein the second flow control unit comprises a front flow control valve and a rear flow control valve, and wherein the pressure supply inhibiting unit controls the rear flow control valve, when a defect has occurred in a portion of the second downstream flow path extending between the front flow control valve and the wheel cylinders, such that a brake fluid pressure supplied to the wheel cylinders via the front flow control valve is equal to the brake fluid pressure supplied by the first pressure supplying unit multiplied by a predetermined constant.

9. The apparatus according to claim 1, wherein the second flow control unit comprises a front flow control valve and a rear flow control valve, and wherein the pressure supply inhibiting unit controls the front flow control valve, when a defect has occurred in a portion of the second downstream flow path extending between the rear flow control valve and the wheel cylinders, such that a brake fluid pressure supplied to the wheel cylinders via the front flow control valve is equal to the brake fluid pressure supplied by the first pressure supplying unit multiplied by a predetermined constant.

10. The apparatus according to claim 1, further comprising a second defect locating unit for determining whether a defect has occurred in the second upstream flow path, based on a brake fluid pressure measured in the second upstream flow path.

* * * * *

UNITED STATES PATENT AND TRADEMARK OFFICE
CERTIFICATE OF CORRECTION

PATENT NO. : 5,979,997
DATED : November 9, 1999
INVENTOR(S) : Masayasu OHKUBO, et al.

It is certified that error appears in the above-identified patent and that said Letters Patent is hereby corrected as shown below:

```
Column 7, line 15, delete "a".

Column 15, line 66, delete "so".

Column 22, line 9, change "cylinder" to --cylinders--.

Column 22, line 17, change "cylinder" to --cylinders--.

Column 22, line 46, change "front" to --rear--.
```

Signed and Sealed this

Twenty-seventh Day of March, 2001

Attest:

NICHOLAS P. GODICI

Attesting Officer

Acting Director of the United States Patent and Trademark Office